United States Patent [19]

Springer

[11] Patent Number: 4,527,169

[45] Date of Patent: Jul. 2, 1985

[54] TONER TRANSFER APPARATUS WITH SLIP ACTION

[75] Inventor: Gilbert D. Springer, Sunnyvale, Calif.

[73] Assignee: Ferix Corporation, Fremont, Calif.

[21] Appl. No.: 588,207

[22] Filed: Mar. 12, 1984

[51] Int. Cl.[3] .............................................. G01D 15/12

[52] U.S. Cl. ..................................................... 346/74.2

[58] Field of Search .............................. 346/74.2, 138; 355/3 TR

[56] References Cited

U.S. PATENT DOCUMENTS 2,943,908 7/1960 Hanna ................................ 346/74.2

4,095,886 6/1978 Koeleman et al. .............. 355/3 TR

*Primary Examiner*—Thomas H. Tarcza

*Attorney, Agent, or Firm*—Kolisch, Hartwell & Dickinson

[57] ABSTRACT

An apparatus for transferring toner from an incompressible, flexible magnetic image-storage medium to paper. The apparatus includes a cylindrical drum having a layer of resilient backing material on an inner support structure. An image-storage medium is slidably disposed on the backing material. A pressure roller also having a resilient surface layer is placable against the roller to form, in combination therewith, a pinch roller through which paper is transported during toner transfer. Deformation of the respective resilient layers in the roller and drum during transfer produces a complimentary slip action between the resilient backing and image-storage medium. This allows the paper and medium to move together without smearing the associated toner images.

6 Claims, 3 Drawing Figures

TONER TRANSFER APPARATUS WITH SLIP ACTION

BACKGROUND AND SUMMARY OF THE INVENTION

This invention pertains to an apparatus for transferring toner from a magnetic image-storage medium to paper or other toner-adherable receiving medium. Specifically, it pertains to such an apparatus in which the magnetic image-storage medium is carried on a resilient backing and mounted slidably therewith to allow for slip action between the two when a pressure roller presses paper against the magnetic medium during toner transfer.

The present invention is particularly suited to be used in a magnetographic reproduction system having a magnetic image-storage medium on which an electromagnetic read/write head produces magnetic images. The image-containing medium is transported past a toner decorator having a supply of toner and means for presenting the toner to the medium. The magnetic images in the medium attract the toner, thereby creating toner images on the medium. According to a preferred embodiment, the medium, and thereby the toner images, is then bombarded with positive ions from a corona discharge device. A toner-adherable receiving medium such as paper is then fed into the system after it has first been given a positive charge. This prevents the toner from not prematurely jumping from the medium to the paper. The paper is then fed adjacent the image-storage medium to a toner transfer apparatus made according to this invention. At this point, the paper is also provided with a charging field which acts to draw the positively-charged toner off of the medium and onto the paper. The toner is finally fused to the paper in a downstream heat and/or pressure fusing operation. After toner transfer, the image-storage medium is cleaned and erased in preparation for a repeat of the cycle just described with new images.

Directing attention directly to the toner transfer apparatus of this invention, it has been discovered that the magnetic image-storage medium, although manufactured to be a smooth surface, in fact has an uneven surface due to dust and other surface-laden pollutants which end up on the magnetic-image-storage medium surface. Further, it has been found that if too much pressure is used during the transfer process, "ghosts" are impressed on the magnetic medium. These cause further problems with subsequent magnetic imaging and toner transferring.

Also, the magnetic medium normally is disposed on a drum core which has a relatively large radius as compared to the pressure roller used to press the paper against the medium during transfer. It is a characteristic of the paper to break away most easily from the roller since it has a smaller diameter and places a greater stress on the paper.

Finally, a significant disadvantage of conventional roller transfer systems is that the magnetic medium is attached to the drum core on which it is mounted in a substantially fixed position. When paper is pressed against the medium, it is stressed as it responds to the various forces applied to it along its travel path. One result of this is that there typically is movement between the magnetic medium and the paper due to differences in path lengths traveled by the medium and the paper in the region of contact.

It is therefore a general object of the present invention to provide a system having improved toner transfer characteristics.

More specifically, it is an object to provide such an apparatus in which controlled, limited pressure is applied to the magnetic medium during the transfer process.

It is also an object to provide an apparatus in which the paper and magnetic medium are maintained substantially stationary relative to each other during the toner transfer process.

Thus, it is specifically an object of the present invention to provide an apparatus in which the magnetic medium is slidably disposed on a resilient backing.

It is a further object to provide a toner transfer apparatus having a toner-image carrying drum and a pressure roller which creates a buckle in the magnetic medium downstream of the pressured contact region with the paper during toner transfer to enhance the separation of paper and magnetic medium at the completion of the toner transfer process.

My present invention satisfies these and other objects by providing a magnetic image-storage medium which is mounted preferably on a resilient backing on a support which allows the magnetic medium to freely slide along a path along which the medium is transported. A pressure roller, optionally having a resilient surface layer, is placable against paper which is transported between the roller and the magnetic medium. The paper is in turn pressed against the magnetic medium, thereby distorting the underlying backing layer.

The deformation in the magnetic medium resulting from the pressured contact with the roller produces a slip action between the magnetic medium and the backing. The resulting reduction in path length is accommodated by a buckling in the medium downstream in the travel path adjacent the pressured contact region. There is thus developed a limited pressure contact region for toner transfer coupled with slip action between the magnetic medium and its associated backing. This results in substantially reduced relative motion between the toner-receiving paper and the magnetic medium during toner transfer. Additionally, the buckling effect creates a small-radius bend in the magnetic medium which is less than the circumferential radius of the pressure roller, thereby enhancing separation of the paper from the magnetic medium. These and additional objects and advantages of the present invention will be more clearly understood from a consideration of the drawings and the following detailed description of the preferred embodiment.

DETAILED DESCRIPTION OF THE INVENTION

Figure 1:
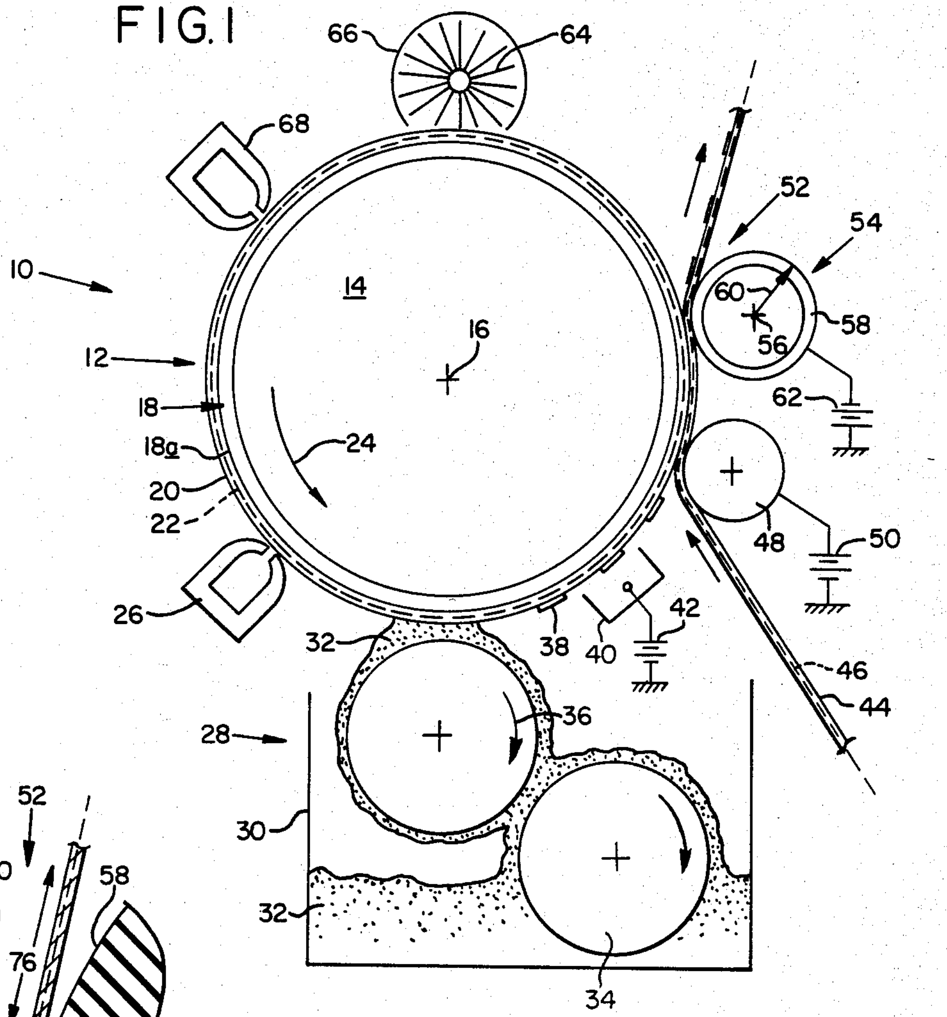
FIG. 1 is a schematic end elevation showing an imaging system incorporating the present invention.

Referring initially to FIG. 1, a magnetic-imaging system, shown generally at 10, in which the preferred embodiment of the present invention is shown. System 10 includes as its primary element a drum 12. The drum, also referred to as magnetic image-carrier means and rotary drum means, includes a central cylindrical core, or support means, 14 which is rotatable about a drum axis 16. Core 14 has a cylindrical surface on which is mounted a resilient backing, or backing means, 18 which is preferably made of felt having a thickness of approximately 1/16 inch. Backing 18 has an outer surface expanse 18*a* on which is mounted a conventional magnetic image-storage medium 20, such as gamma ferric oxide. Medium 20 travels with the circumference of drum 12 along a path, also referred to herein as a second path, 22 shown in dashed lines. Medium 20 is mounted on backing 18 in such a manner that it is slidable relative to the backing along the circumference of drum 12.

Drum 12, in the illustration shown in FIG. 1, is mounted for rotation in a counterclockwise direction as illustrated by arrow 24. It is constructed to have an external diameter of approximately 5.1 inches. This equates to a circumferential length for medium 20 of 16-inches. This medium coating has a thickness which typically lies within the range of 300 to 500 microinches.

Disposed on the lower left margin of drum 12 is a magnetic write head 26 which may be electrically excited to produce magnetic images in magnetic medium 20. As the drum rotates, the latent images pass adjacent a toner decorator system, shown generally at 28. Generally speaking, system 28 includes a container 30 holding a reservoir of toner 32. A rotary magnetic brush 34 is disposed in contact with the reservoir of toner to transfer it out of the reservoir upwardly in a clockwise direction adjacent a decorator roller 36. Decorator 36 conveys the toner adjacent the surface of drum 12. The latent magnetic images in medium 20 attract the toner, creating thereby, what are herein referred to as toner images 38.

In a counterclockwise direction from decorator system 28 is a positive ion applying corona discharge unit 40 which is connected to a positive voltage source 42.

On the right side of drum 12 as shown in FIG. 1, a toner-adherable receiving medium, such as paper, 44 which travels along what is also referred to as a first path 46, is shown in dashed lines. As the paper travels along paper path 46, it passes a rotary paper guide 48 disposed adjacent drum 12. Guide 48 is attached to a positive voltage source 50. Guide 48 directs the paper against the surface of magnetic medium 20 with which it travels up to a toner transfer system, shown generally at 52. In addition to drum 12, transfer system 52 includes a pressure roller, or roller means, 54 which is also cylindrical and has a length conforming to the length of drum 12. Roller 54 is rotatable about an axis 56 and has disposed about its perimeter a resilient cushion, or surface layer means, 58. Cushion 58 is preferably made of a conductive elastomer and has a thickness of $\frac{1}{8}$ to $\frac{1}{4}$-inch. The outer surface of cushion 58 has a radius, as illustrated by arrow 60, of between $\frac{1}{2}$ and 1 inch. Roller 54 is attached to a negative voltage source 62.

Paper 44 separates from drum 12 at transfer system 52. On top of drum 12 is shown a cleaning brush 64 which typically is disposed within a vacuumed housing 66.

Finally, between brush 64 and head 26 is disposed an electromagnetic erasing head 68.

Figure 2:
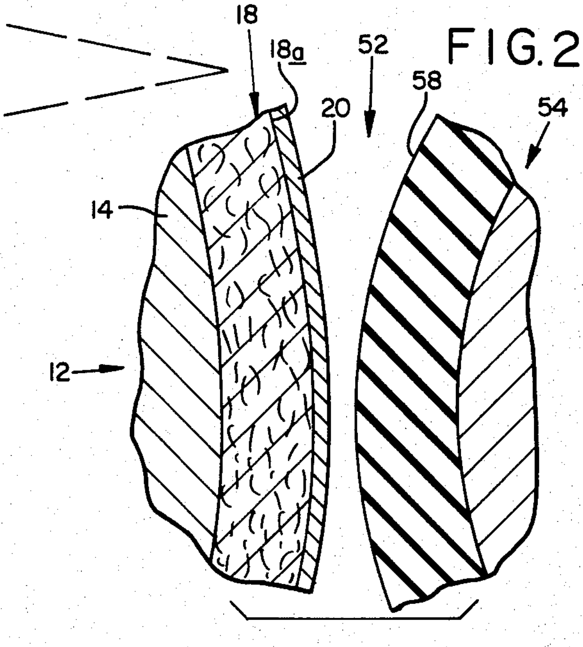
FIG. 2 is a substantially enlarged fragmentary cross-sectional view of a portion of the preferred embodiment shown in FIG. 1 in an initial position prior to pressured contact for toner transfer.

Referring now specifically to FIG. 2, in fragmentary form, not to scale, is shown a portion of toner transfer system 52 in a non-operative state prior to the introduction of paper during a toner transfer process. It can be seen that when roller 54 is separated from drum 12, backing 18 and cushion 58 are in relaxed states, thereby allowing magnetic medium 20 to travel along a cylindrical path about drum 12.

Figure 3:
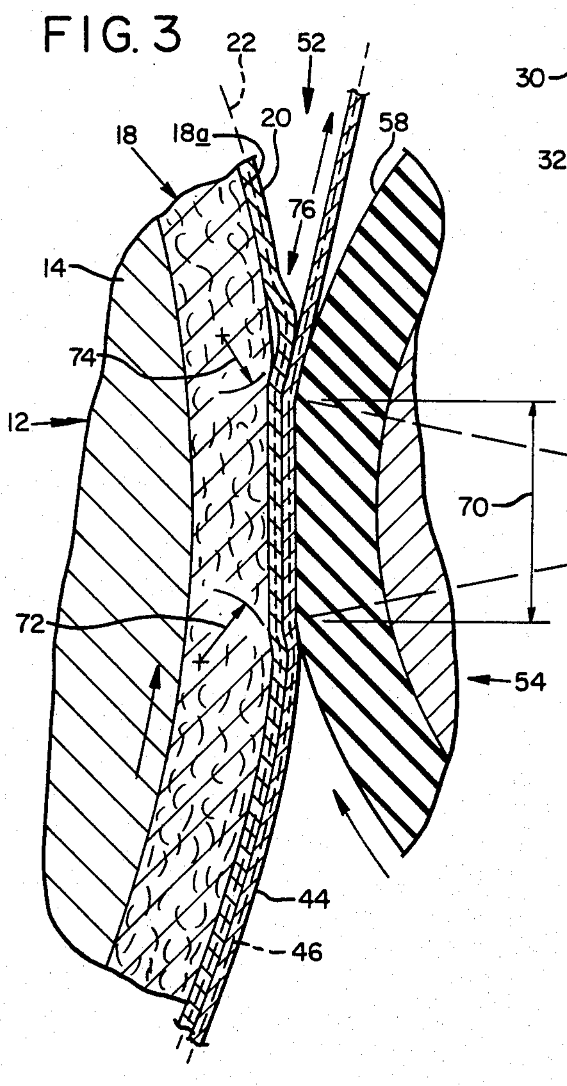
FIG. 3 is a view similar to FIG. 2 showing operation of the preferred embodiment.

In contrast, FIG. 3 illustrates the transfer system during operation. Paper 44, traveling along paper path 46 adjacent magnetic medium 20 which correspondingly travels along path 22, enters into a region of pressured contact shown generally at 70. In this region, roller 54 is pressing against paper 44 which in turn is pressing against medium 20. As a result of the pressure forces involved, backing 18 and cushion 58 are respectively radially deformed. The relative thicknesses and radii of the drum and roller provide for generally even pressure distribution between the drum and roller. As a result, the paper and magnetic medium assume a generally planar configuration within region 70. The plane of this configuration is a plane perpendicular to the plane of view of FIG. 3 containing the line of contact between medium 20 and paper 44.

In order to accomplish this controlled deformation of path 22, medium 20 must turn at a radius greater than the circumference of drum 12 at its lower and upper margins adjacent region 70 as shown by radial arrows 72, 74, respectively. It will be noted that instead of traveling along its otherwise normal arc, magnetic medium 20 essentially travels along a cord spanning the same arc. Since gamma ferric oxide as a typical magnetic medium is relatively flexible but substantially incompressible, there is an excess of medium 20 relative to the corresponding length of surface expanse 18*a* within the region adjacent and including region 70. Because paper 44 and medium 20 are in intimate contact preceding region 70 and additionally medium 20 is slidable relative to backing 18, there is a resulting buckle shown generally at 76 in medium 20 which accommodates the now excess amount of medium 20. If roller 54 was placed against drum 12 in a static condition, it is expected that buckle 76 would be smaller and that there would be a corresponding buckle below region 70. For the reason just described in part, and further by the fact that paper guide 48 places paper 44 in intimate contact against medium 20 over a portion of the circumference of drum 12 preceding region 70, the buckle tends to curve in what may be considered the downstream region adjacent region 70, as has been illustrated.

In operation, drum 12 rotates in a counterclockwise direction as illustrated by arrow 24 at a rate of approximately 20 to 40 revolutions-per-minute during an imaging process or at approximately 160 revolutions-per-minute for strictly a printing operation where the same toner images are applied to a plurality of copies. Latent images within medium 20 pass decorator system 28 where toner 32 adheres to the latent images to become toner images 38.

As the toner-image-containing medium passes corona discharge unit 40, positive ions are applied to the medium, and therefore to the toner. Correspondingly, as paper 44 approaches drum 12 adjacent paper guide 48, positive charges are also applied to the paper. Thus, as the paper and medium come together adjacent guide 48, attractive forces are neutralized, thereby preventing premature migration of the toner before intimate contact between the paper and medium.

The paper, traveling at a speed corresponding to the circumferential speed of medium 20, then travels up to toner transfer system 52. Roller 54 is given a negative charge so that the positively charged toner images are strongly attracted to the paper at the point where the paper separates from medium 20 just above region 70. The toner-image-containing paper then travels to a conventional pressure and/or heat based fusing system.

It will be noted, with particular reference to FIG. 3, that several advantages are provided by the instant invention. Of particular importance is the fact that the paper and magnetic medium are maintained in intimate contact to avoid relative slippage between them. There is an accommodating slip action occurring between the medium and the underlying backing 18. This prevents blurring of the toner images during transfer onto the paper. Resilient backing 18, along with cushion 58, distribute the pressure occurring between the paper and the medium. There is thus less likelihood that there will be some fusing occurring due to the pressure. Correspondingly, there is substantially less likelihood that ghosts or image impressions will be left on medium 20 after toner transfer. The resiliency in the backing also minimizes voids due to lack of compliance between the paper and medium which could otherwise occur. The medium and paper have greater friction between them than does the medium and the felt pad. Any slippage which occurs therefore must occur where there is less friction. This results in the buckling of the medium as has been described.

The slip action which occurs between medium 20 and backing 18 has further advantages relative to paper separation from the medium. It will be noted that without the buckling the medium and paper are caused to bend into region 70 at a radius illustrated by arrow 72. It will be noted that this radius of curvature is substantially less than the radius of curvature of roller 54. Without buckle 76 it would be anticipated that at least this amount of relative bending of medium 20 would occur above region 70 as well. This does in fact enhance the separation of paper 44 from the medium since the paper will tend to follow the path of least since because it produces less stress on the paper. Thus, whereas the paper was following drum 12 with a relatively large radius of curvature, it is caused to tend to follow roller 54 by the bend at the upper end of region 70.

This bending is further increased, and therefore made more effective, by the buckling which occurs at 76 because it has an even a smaller radius of curvature, as illustrated by arrow 74. There is thus a sharp breakaway point adjacent buckle 76 which causes a high field gradient due to the voltage applied to roller 54. This makes the toner transfer to the paper faster, thereby producing more sharply defined images.

It will be understood that, although no toner images have been illustrated with reference to FIG. 3, they do in fact occur as illustrated with reference to FIG. 1 during a normal transfer operation.

In summary, it will be understood that a toner transfer system as described which provides for radial movement of a backing 18 during pressure contact by a pressure roller and which permits movement of an associated magnetic medium concentrically to accommodate the backing deformation has several advantages. In particular, it provides a slip action between the medium and backing rather than between the medium and toner-image-carrying paper. It can therefore be seen that the objects and advantages of the present invention have been satisfied by the preferred embodiment as described. While the invention has been particularly shown and described with reference to the foregoing preferred embodiment, it will be understood by those skilled in the art that other changes in form and detail may be made therein without departing from the spirit and scope of the invention as defined in the following claims.

It is claimed and desired to secure by Letters Patent:

1. In a toner transfer system of the type usable with a magnetically attractable toner and a toner-adherable receiving medium transportable along a first known path, toner transfer apparatus comprising magnetic image-carrier means including support means, resilient backing means, having a surface expanse, mounted on said support means and substantially incompressible, flexible, web-like magnetic image-storage means slidably disposed on and in general conformity with the surface expanse of said backing means for sliding and transporting along a second path a portion of which is disposable adjacent the previously mentioned first path, and pressure roller means operatively disposable adjacent said first path opposite from said second path when the second path is disposed adjacent the first path, for pressing the receiving medium during travel along the first path against said image-storage means during travel along said second path sufficiently to compress radially said backing means with the resulting change in distance traveled by said image-storage medium in the region of pressured contact being accommodated by a complimentary slip action between said backing means and said image-storage means along said second path.

2. In a toner transfer system of the type usable with a magnetically attractable toner and a toner-adherable receiving medium transportable along a first known path, toner transfer apparatus comprising rotary drum means including cylindrical support means rotatable about the cylinder axis, resilient backing means disposed on said support means and having a cylindrical surface expanse spaced from said support means, and substantially incompressible, flexible, web-like magnetic image-storage means slidably disposed on and in general conformity with the surface expanse of said backing means for sliding circumferentially relative to said backing means, and pressure roller means operatively placable against said image-storage means, said drum means and roller means cooperatively forming, in operation, pinch-roller means through which the receiving medium is transportable, during which transporting said backing means is deformed in a region of pressured contact between said drum means and roller means with the resulting change in circumferential surface length of the surface expanse of said backing means being accommodated by a complimentary slip action between said backing means and image-storage means.

3. The apparatus of claim 2, wherein said roller means includes resilient surface layer means.

4. The apparatus of claim 2, wherein said drum means and roller means are structured in such a manner that, in operation, said image-storage means buckles outwardly from the cylindrical path adjacent at least one end margin of the region of pressured contact in response to the slip action between said backing means and image-storage means.

5. The apparatus of claim 4, wherein said roller means has a known radius of curvature and the buckle in said image-storage means has a radius of curvature less than the radius of curvature less than the radius of curvature of said roller means.

6. The apparatus of claim 2, wherein said drum means and roller means are structured in such a manner that, in operation, the path said image-storage means follows within the region of pressured contact is generally planar over a majority of the region.

* * * * *